Dec. 24, 1968  R. M. ZELL  3,417,450
METHOD FOR MAKING A PLUMBING VALVE BODY
Filed Nov. 25, 1966

INVENTOR
ROBERT M. ZELL
BY Cullen, Sloman, & Cantor
ATTORNEYS

United States Patent Office 3,417,450
Patented Dec. 24, 1968

3,417,450
METHOD FOR MAKING A PLUMBING
VALVE BODY
Robert M. Zell, Huntington Woods, Mich., assignor to
Brass Craft Manufacturing Co., Detroit, Mich.
Filed Nov. 25, 1966, Ser. No. 597,054
1 Claim. (Cl. 29—157.1)

ABSTRACT OF THE DISCLOSURE

The method disclosed herein relates to forming the valve body or barrel of an under-fixture type of plumbing valve, having an outwardly extending spout or fitting formed integral with the body, by means of extruding a brass rod which is polygonal, and preferably hexagonal in cross-section with an integral T joined therewith, and thereafter cutting away the material forming the T, above and below the spout and then cutting the T into the shape of the threaded spout and cutting into the polygonal portion the conventional end connectors, and threaded openings and valve sheet. The method results in a completely integral or one-piece construction.

This invention relates to a method for making a plumbing valve body and more particularly the body or barrel of a plumbing valve commonly referred to as an under-fixture valve.

Conventional under-fixture type of plumbing valves include a valve body which is generally cylindrical in shape with its external walls formed in a hexagonal or other polygonal shape. Holes are formed in the opposite ends of the body, one hole at the upper end to receive a valve stem assembly, and the other at the lower end to connect to the water inlet line. A valve seat is generally formed in the interior of the body. In addition, a threaded spout or fixture, having a central opening, is usually connected to the body intermediate the ends for receiving a connector nut for connecting to the outlet line.

This type of valve is usually located beneath a plumbing fixture such as a sink or toilet or the like, and serves as a means for shutting off the water flow to the fixture, particularly when necessary for repairing the conventional manually operated fixture valves.

In the conventional valve constructions, the outlet spout or fitting has always been made as a separate part which was welded or brazed to the valve body. Such type connection has proven in the past to be troublesome, particularly because leaks tend to develop at the weld or braze connection, and thus necessitate replacement of the valve. Moreover, in the manufacturing process, a number of special precautions and inspection tests are required to make the connection as leakproof as possible.

Hence, it is an object of this invention to provide an economical method for manufacturing the valve body with the outlet spout as one integral unit, out of a single piece of metal, thereby completely eliminating the need for welding or brazing or otherwise fastening the spout to the body or barrel of the valve.

Another object of this invention is to provide a method for forming a valve body or barrel by first extruding a bar having a polygonal shaped portion which corresponds to the polygonal exterior shape of the body, and also a T-shaped integral portion of a size to be cut into the shape of the spout integral with the body portion, to thus provide a leakproof connection therebetween.

These and other objects and advantages of this invention will become apparent upon reading the following description, of which the attached drawings form a part.

Figure 7:
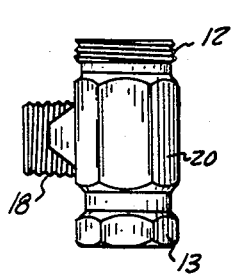
FIG. 7 is an elevational view showing the complete valve body.
Figure 8:
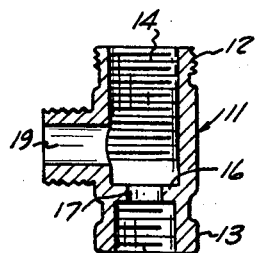
FIG. 8 is an elevational cross-sectional view of the complete valve body.
Figure 9:
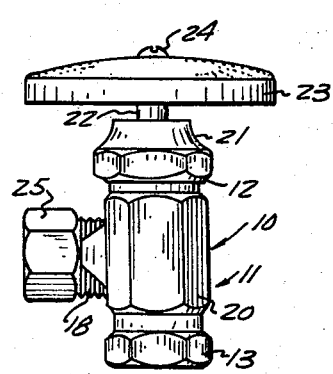
FIG. 9 shows a complete valve assembly in elevation.

FIG. 9 illustrates a conventional underfixture plumbing valve 10 but having the improved valve body or barrel 11 assembled therewith. As shown in FIGS. 7 and 8, the valve body or barrel 11 is formed with an upper threaded end 12, a lower nut-shaped end 13, an upper, threaded valve stem opening 14, which receives the conventional valve stem, and a lower threaded inlet opening 15 to which is connected the water inlet pipe.

Between the upper and lower openings, there is located an integral valve seat 16 having a central opening or hole 17 for passage of the water. The valve stem closes the opening 17 as is conventional to shut off the water flow.

The foregoing description is of a conventional construction. The improvement here is in the integral, threaded fitting spout or outlet 18, whose central hole 19 communicates with the interior of opening 14.

The valve body, as is customary, is formed in a polygonal exterior shape, and preferably hexagonal in shape for both decorative design as well as for cooperation with a suitable wrench.

As shown in FIG. 9, the assembled valve includes the body 11, described above, and in addition, an upper cover nut 21 having a central opening through which the valve stem 22 extends. A handle 23 is fastened to the valve stem by the conventional screw fastener 24. In addition, a connection nut 25 is threaded upon the spout 18 for connection to an outlet pipe.

In usual operation, water enters through an inlet pipe (not shown), connected into the opening 15, upwardly through the hole 17 in the valve seat 16 and out through the spout 18 and through the outlet pipe (not shown) to the fixture valve mounted upon the conventional fixture. The flow of water is shut off by turning the valve stem 22 so that its lower seat (not shown) closes against the valve body seat 16.

The invention herein is concerned with a method for making the valve body wherein the spout is formed as one piece or integral with the barrel of the valve body. Thus, the method begins with an extruded bar 30, preferably formed of conventional brass material as is commonly used in plumbing valves. The bar is of uniform cross-section and has two integral portions, namely a main polygonal shaped portion 31 whose exterior dimensions conform to the exterior polygonal dimensions of the finished valve body, and an extension portion 32 shaped like a T and having a base 33 integral with one side of the polygon and a head 34 spaced from the polygon.

Figure 1:
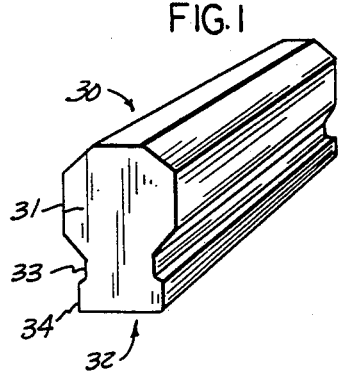
FIG. 1 is a perspective view of a portion of an extruded bar.
Figure 2:
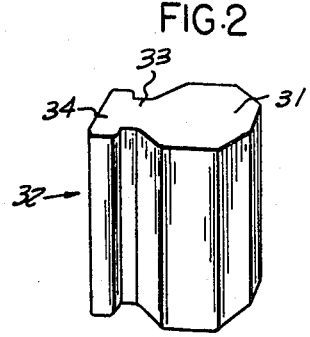
FIG. 2 shows the first step in the process, namely cutting a short length off the bar.
Figure 3:
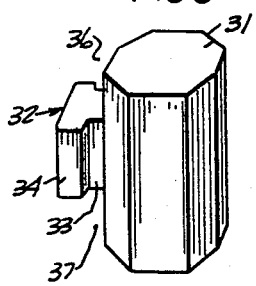
FIG. 3 is a perspective view showing a portion of the bar cut away to form the spout.
Figure 4:
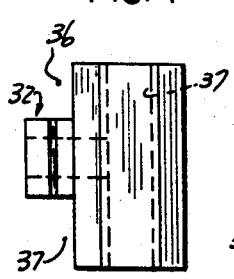
FIG. 4 is an elevational view of the part shown in FIG. 3.
Figure 5:
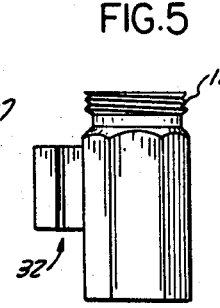
FIGS. 5 and 6 are two successive steps showing the processing of the valve body.

As shown in FIG. 2, the bar 30 is cut into lengths substantially equal to the finished length of the valve body, and thereafter (see FIGS. 3 and 4), the T-shaped extension portion is cut away at 36 and 37 above and below the location of the spout.

Figure 6:
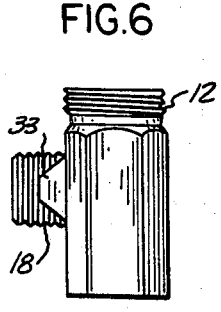

Following this a number of conventional cutting steps take place, although not necessarily in any predetermined order given below, but rather in the order most convenient to the manufacturer. These steps comprise drilling a central hole 37 through the valve body (see FIG. 4) and a hole 19 through the T-shaped extension portion. Next, the upper threaded connector end 12 is formed on the valve body by means of a suitable cutting machine, and the remaining portion of the T-shaped extension is cut into a circular cross-section and threaded (see FIG. 6). The circular cross-section is of greater diameter than the width of the base of the T so that a portion of the base remains as shown in FIG. 6. Hence, the leg of the T serves as an undercut area which permits threading and cutting without damaging or scratching the barrel.

Next, as shown in FIG. 7 and FIG. 8, the lower nut portion 13 is formed and the holes 14 and 15 are drilled and tapped to leave the valve seat portion 16.

In some valves, the lower nut portion 13 is omitted and the lower opening 15 is not threaded but rather is left smooth for fastening to an inlet pipe by means of soldering.

As can be seen, by beginning with the extruded bar, the finished polygonal shape of the barrel is provided as well as providing a means for forming the spout integral with the valve barrel so as to eliminate the prior necessity for a separate connecting operation with all its attendant problems, including leakage and the like.

This invention may be further developed within the scope of the following claim. Accordingly, it is desired that the foregoing description be read as being merely illustrative of an operative embodiment of this invention and not in a strictly limited sense.

I claim:
1. In a method for making an elongated hollow angle valve body having a barrel and a spout; with the barrel having its center portion of octagonal shape and with the spout extending transversely of such central portion of the barrel; the steps of:
   (a) extruding a length of metal bar stock having a major barrel-providing portion and a minor spout-providing portion of T cross-section;
   the length of the stock being many times greater than any transverse dimension of it;
   with all of the exposed surfaces being smooth and planar;
   the minor T-shaped portion having its base coextensive with one face of the major portion;
   (b) transversely cutting the bar stock into blanks each of the length of a finished barrel;
   (c) cutting away the ends of the minor portion of such a blank back to the major portion to leave the ends of the major portion with eight sides exposed, and with the remaining central part of the minor portion providing the stock for the spout;
   (d) operating an exterior threading tool on what is left of the T-shaped minor portion by movement of the tool towards the major portion until an audible change in the sound of the threading tool operation is heard at which time the threading operation is terminated, thus forming a threaded spout providing portion;
   (e) drilling a central hole through such spout-providing portion;
   (f) drilling central holes into the ends of the major portion towards the center thereof to define valve seat shoulders between the inner ends of the holes;
   (g) and exteriorly cutting the major portion ends to form connection ends while preserving the octagonal configuration of the major portion between its ends.

References Cited
UNITED STATES PATENTS

| 2,309,666 | 2/1943 | Parker | 29—157.1 |
| 2,669,011 | 2/1954 | Brumbaugh | 29—157.1 |

JOHN F. CAMPBELL, *Primary Examiner.*

PAUL M. COHEN, *Assistant Examiner.*

U.S. Cl. X.R.

29—558